(12) United States Patent
Pradhan

(10) Patent No.: US 6,662,422 B2
(45) Date of Patent: Dec. 16, 2003

(54) METHOD FOR ATTACHING A HEADREST GUIDE TO A SEAT FRAME

(75) Inventor: Arvind Pradhan, West Boomfield, MI (US)

(73) Assignee: Camaco, Novi, MI (US)

( * ) Notice: Subject to any disclaimer, the term of this patent is extended or adjusted under 35 U.S.C. 154(b) by 113 days.

(21) Appl. No.: 09/928,069

(22) Filed: Aug. 13, 2001

(65) Prior Publication Data

US 2003/0029020 A1 Feb. 13, 2003

(51) Int. Cl.[7] ............................................... B21D 39/00
(52) U.S. Cl. .............................. 29/523; 29/29; 29/509; 297/452.18
(58) Field of Search ...................... 29/505, 509, 520, 29/523, 515, 243.517, 243.5, 282, 283.5; 297/452.18, 391, 410; 72/411, 256

(56) References Cited

U.S. PATENT DOCUMENTS

| 3,140,540 | A | * | 7/1964 | Greenman | 29/523 |
| 3,280,454 | A | * | 10/1966 | Rich et al. | 29/523 |
| 3,327,385 | A | | 6/1967 | Shaver | 29/512 |
| 4,182,193 | A | * | 1/1980 | Schultz, Jr. | 29/509 |
| 5,092,634 | A | * | 3/1992 | Miller | 29/523 |
| 5,769,499 | A | | 6/1998 | Dudash et al. | 297/452.18 |
| 6,035,516 | A | | 3/2000 | Petersen | 29/523 |
| 6,338,191 | B1 | * | 1/2002 | Petersen | 29/523 |

* cited by examiner

Primary Examiner—Gregory Vidovich
Assistant Examiner—Jermie F. Cozart
(74) Attorney, Agent, or Firm—Charles W. Chandler

(57) ABSTRACT

A method for connecting a headrest guide tube in a vehicle seat frame comprises the steps of forming a hole in the seat frame, inserting a headrest guide tube into the hole, axially compressing the tube to form a pair of rings on opposite sides of the frame wall, and then axially crushing the rings to form a pair of beads tightly clamping the headrest guide tube to the seat frame. During the crushing process, a portion of the headrest guide tube is bulged into a notch in the hole in the seat frame to prevent the guide tube from rotating with respect to the seat frame.

5 Claims, 2 Drawing Sheets

METHOD FOR ATTACHING A HEADREST GUIDE TO A SEAT FRAME

BACKGROUND AND SUMMARY OF THE INVENTION

This invention is related to a process for attaching a pair of headrest guide tubes on a vehicle seat frame. The guide tubes provide sockets for a pair of plastic inserts for headrest height adjustment. The height of the headrest is adjusted by adjusting the position of the pegs in the inserts.

The prior art is concerned with a method for attaching the guide tubes to the seat frame without welding, and in a minimal number of steps. One such process is described in U.S. Pat. No. 6,035,516 issued Mar. 14, 2000 to Horst Udo Petersen for "Securement of Head Rest Support into Automobile Seat Frame". Petersen describes a system in which the guide tube has a preformed ring or annular enlargement. The guide tube is placed in a hole in a web in the seat frame, the ring abutting the edge of the hole. The tube and seat frame are located in a die. A punch is then lowered over the tube to form a second ring on the other side of the web. When the punch is withdrawn, the web is clamped between the two rings.

Another similar process is described in U.S. Pat. No. 5,769,499 issued Jun. 23, 1998 to Eugene S. Dudash, et al. for "Motor Vehicle Seat". Dudash employs a process in which the guide tube is inserted in an opening in the seat frame. The tube then is swaged on both sides of a flat section of the seat frame to secure the guide tube in the opening. He describes this process as preferably preforming the guide tube with one swaged portion, inserting the tube into the opening, and then forming a second swaged portion in the tube after insertion.

U.S. Pat. No. 3,327,385 issued Jun. 27, 1967 to Raymond H. Shaver for "Method of Making Ladders" shows an arrangement in which the tube is inserted in a hole in a wall structure having a notched opening. The tube is then expanded outwardly into the notch to form a detent or radial key in the notch to anchor the rung against rotation.

One of the reasons that the prior art preforms the first ring is to provide means for locating the tube in the seat frame. This invention eliminates that step so that the entire process is formed in one continuous motion.

The preferred embodiment of the invention employs a process in which a guide tube is inserted into an opening in the seat frame. The frame either may have a flat wall such as an I-beam or C-Frame type structure, or comprise a tubular frame member that has been collapsed to form a pair of adjacent flat walls. An opening is formed in each flat wall. The opening has one or more key slots or notches. The guide tube is then inserted in the opening and a pair of rings is formed in the guide tube, simultaneously, one on each side of the frame walls. The rings are then crushed so that the guide tube material bulges into the notches, thereby providing an attachment that prevents either axial or rotational motion of the guide tube in the frame. Both rings are formed and crushed in one continuous motion of the dies.

Still further objects and advantages of the invention will become readily apparent to those skilled in the art to which the invention pertains upon reference to the following detailed description:

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
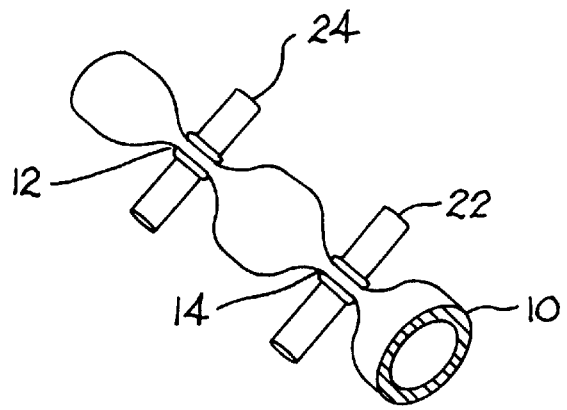
FIG. 1 is a perspective view of a pair of guide tubes attached to a seat frame in accordance with the invention.
Figure 2:
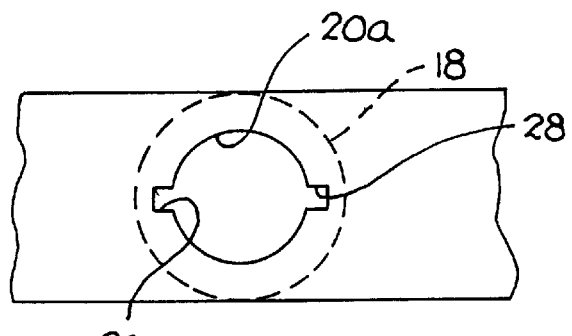
FIG. 2 is a view of a tubular seat frame after it has been collapsed to receive the guide tube, and formed with an opening having a pair of opposed notches.

Referring to the drawings, FIG. 1 illustrates a preferred tubular frame 10, intended to form a horizontal component of a vehicle seat frame. Frame 10 has been collapsed (depressed) in two locations at 12 and 14 such that the opposite sides of the tube form parallel walls 30 and 32 in a face-to-face relationship as illustrated at 16 in FIGS. 3 and 4. This depression is illustrated in FIG. 2 at 18.

Figure 3:
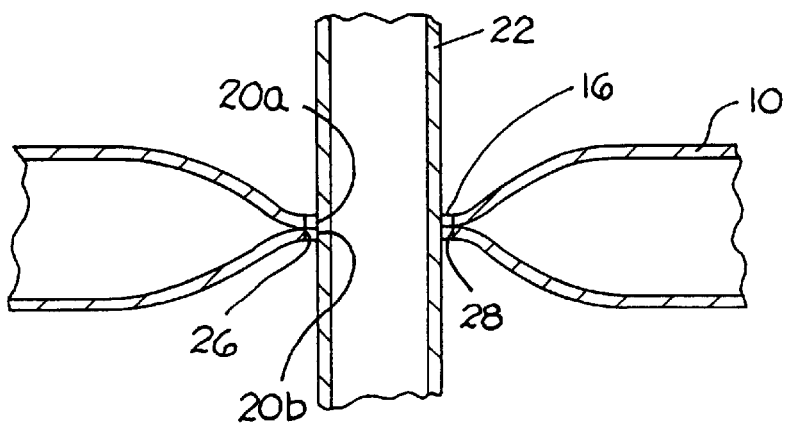
FIG. 3 is a sectional view illustrating the guide tube mounted in the seat frame opening.

A suitable tool or punch is then used to form openings 20a and 20b in the two collapsed locations along frame 10. FIG. 3 illustrates how a typical guide tube 22, formed of a ductile steel, is mounted in openings 20a and 20b. The process illustrates the manner in which both tubes are mounted in their respective openings in frame 10.

Openings 20a and 20b preferably are each formed with a pair of aligned notches 26 and 28 on opposite edges of each of the punched openings. The size of the notches is somewhat exaggerated for descriptive purposes.

Figure 4:
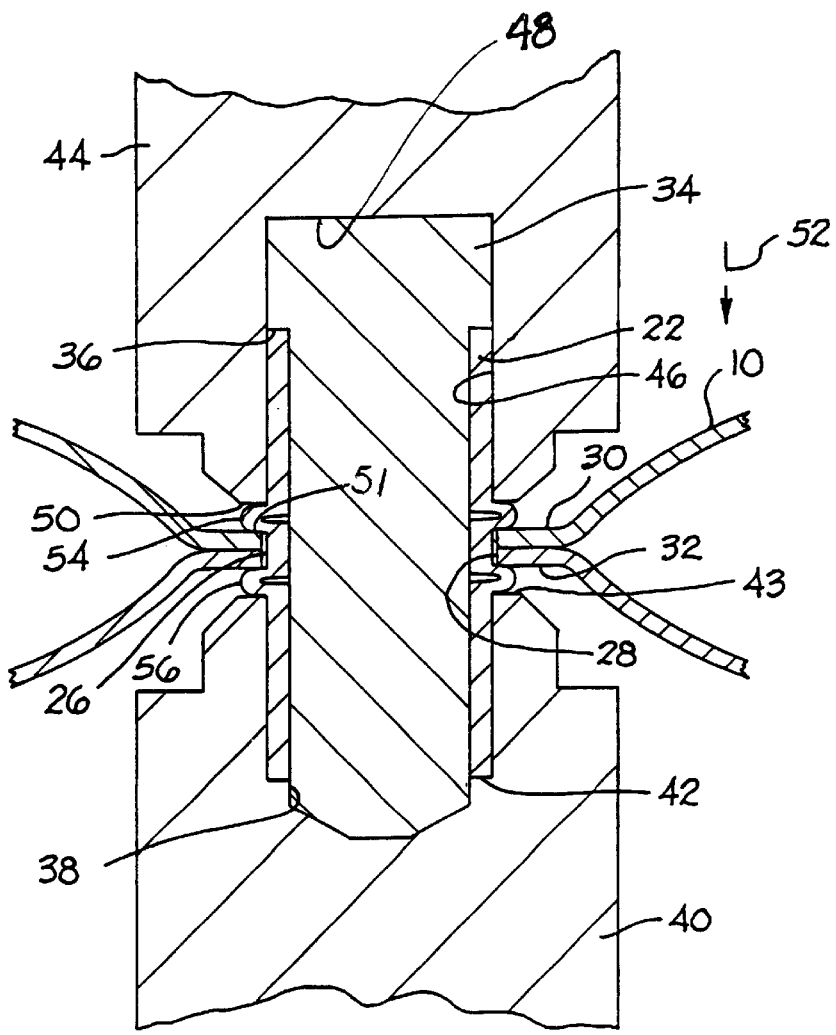
FIG. 4 is a sectional view showing the head rest guide tube mounted in a pair of dies for forming the rings in a single die motion.

A solid steel mandrel 34 is inserted in guide tube 22 until an annular shoulder 36 on the mandrel is seated on the upper end of the tube, as viewed in FIG. 4. The lower end of the mandrel extends below the lower end of the guide tube.

The tube and the mandrel are then inserted in a socket 38 in a lower die 40. The lower end of the guide tube is seated against an annular shoulder 42 in the lower die. The upper end of die 40 is spaced below wall 32 of frame 10 to form an annular opening 43. Then a metal upper die 44 is mounted on the upper end of the mandrel and the guide tube, as illustrated in FIG. 4.

The upper die has a cylindrical bore 46 that receives the guide tube, and a wall 48 that seats against the upper face end of mandrel 34. Both the lower and upper dies form a tight slidable engagement with the guide tube.

The upper die has a lower annular edge at 50 that is spaced above wall 30 of frame 10 to form a second annular opening 51. The upper die is then moved in a continuous axial motion in the direction of arrow 52 toward the lower die. The upper die, as viewed in FIG. 4, pushes the mandrel downwardly, which in turn causes the upper end of the guide tube to move toward its lower end. Since the guide tube is restricted between lower shoulder 42 and upper shoulder 36, the dies will cause the guide tube to expand radially in openings 43 and 51 on opposite sides of walls 30 and 32, to form a pair of annular enlargements 54 and 56.

Continued motion of the upper die toward the lower die will then crush enlargements 54 and 56 to form a pair of annular beads 58 and 60 tightly clamping walls 30 and 32 between them. The guide tube material also bulges outwardly into notches 26 and 28 of pinched openings 20a and 20b. This motion achieves a complete connection between the guide tube and frame 10 in one continuous stroke that prevents either rotational motion or axial motion.

Figure 5:
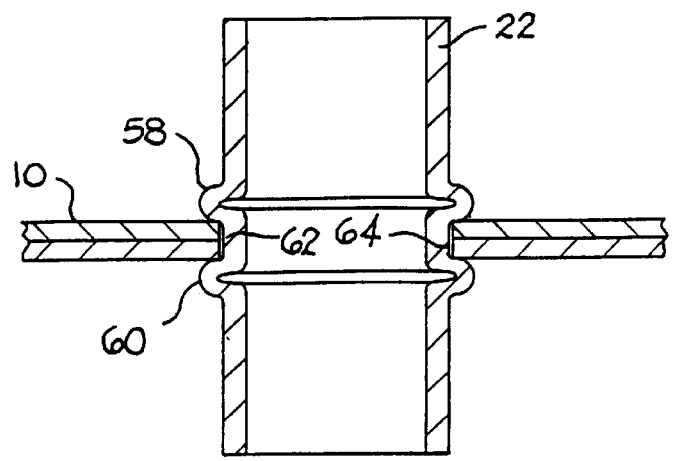
FIG. 5 is a sectional view illustrating the guide tube rings clamped on the seat frame.

The upper and lower dies and the mandrel are then removed from the end product illustrated in FIG. 5. Guide tube 22 is firmly attached to frame 10 with crushed beads 58 and 60 clamped onto the seat frame, and bulges at 62 and 64 seated in notches 26 and 28.

Thus, I have described an improved process for attaching a guide tube to a vehicle seat frame component in which the connection is made in one continuous motion between the upper and lower dies.

This process can be employed for attaching a variety of tubular sections to not only a collapsed tubular frame element but in a hole in an I-beam structure, or extruded or roll-formed section.

Having described my invention, I claim:

1. A process for attaching a headrest guide tube to a seat frame, structure comprising the steps of:

forming a tube-receiving opening in a seat frame structure;

forming a pair of annular radially extending notches which extend axially through the seat frame on opposed, peripheral sides of the tube-receiving opening;

inserting a guide tube, having a wall formed of a ductile metal, into the tube-receiving opening;

then axially compressing the guide tube to radially expand the guide tube wall to simultaneously form a pair of annular enlargements on opposite side of the tube-receiving opening; each annular enlargement having a diameter greater than the diameter of the tube-receiving opening; and subsequently continuing compressing the guide tube to crush the annular enlargements and simultaneously expand the guide tube into said pair of annular notches to retain holding the headrest guide tube in a fixed axial and rotational relationship with respect to the seat frame structure.

2. A process as defined in claim 1, wherein the subsequently continued compression step includes the step of telescopically enclosing a first end of the guide tube in a first die in contact with one of the pair of enlargements, telescopically enclosing a second end of the guide tube in a second die in contact with the other of the pair of enlargements; and moving one of the dies toward the other die to axially crush the enlargements to form said beads.

3. A process as defined in claim 1, in which the seat frame structure comprises a tubular frame member, and further including the step of collapsing the tubular frame member to form a pair of generally planar walls in face-to-face contact, and then forming the tube-receiving opening through said planar walls for receiving the guide tube.

4. A process as defined in claim 1, wherein prior to the step of axially compressing the guide tube inserting a material into the guide tube such that the guide tube wall expands radially outwardly through said openings to form said annular enlargements.

5. A process for attaching a headrest guide tube having a first end and a second end to a seat frame structure, comprising the steps of:

forming a tube-receiving opening in a seat frame structure;

forming a pair of annular radially extending notches which extend axially through the seat frame structure on opposed, peripheral sides of the tube-receiving opening;

said annular notches having a larger radial extension than the radius of the tube-receiving opening;

inserting a guide tube, having a wall formed of a ductile metal, into the tube-receiving opening; and then axially moving a first guide tube end toward an opposite, second guide tube end to expand the guide tube wall to simultaneously form a pair of annular enlargements on opposite sides of the tube-receiving opening; and subsequently continuing to axially move the guide tube to crush the annular enlargements and simultaneously expand the guide tube into said pair of annular notches for holding the headrest guide tube in a fixed axial and rotational relationship with respect to the seat frame structure.

* * * * *